United States Patent [19]

Hefter et al.

[11] 4,325,573
[45] Apr. 20, 1982

[54] DEVICE FOR REGULATING DISCHARGE OF SAND FROM A VEHICLE SANDER

[75] Inventors: Erik Hefter, Eichenau; Rolf Baumgarth, Neufahrn, both of Fed. Rep. of Germany

[73] Assignee: Knorr-Bremse GmbH, Munich, Fed. Rep. of Germany

[21] Appl. No.: 132,615

[22] Filed: Mar. 21, 1980

[30] Foreign Application Priority Data

Mar. 21, 1979 [DE] Fed. Rep. of Germany ....... 2911075

[51] Int. Cl.³ ............................................. B61C 15/10
[52] U.S. Cl. .......................................... 291/3; 291/38; 291/11 A; 222/630; 406/146
[58] Field of Search ................... 406/138, 90, 146; 291/3, 38, 11, 13, 34, 36; 222/630, 195, 396, 399

[56] References Cited

U.S. PATENT DOCUMENTS

| | | | |
|---|---|---|---|
| 2,125,913 | 8/1938 | Goebels | 222/195 |
| 3,425,601 | 2/1969 | Fry | 406/138 |
| 4,099,688 | 7/1978 | Jayne | 291/3 |

FOREIGN PATENT DOCUMENTS 2811 of 1913 United Kingdom ............ 291/11 R

Primary Examiner—H. Grant Skaggs
Attorney, Agent, or Firm—Edmund M. Jaskiewicz

[57] ABSTRACT

A sanding apparatus for a vehicle, particularly rail vehicles, has a sealed container for sand and the container is provided with a bottom wall which is permeable by air. A sand discharge pipe extends from the container through the bottom wall and has an end position in front of a vehicle wheel. An air supply line extends from a source of air under pressure and opens into a chamber underneath the bottom wall of the container. An exhaust air line has one end within the container above the level of sand when the container is full and has its other end connected to the sand discharge pipe. The flows of air through the air supply line and the exhaust air line are so controlled that at a predetermined pressure of supplied air a remaining portion of the supplied air flows through the sand discharge pipe at a rate to discharge a predetermined quantity of sand per unit time from the sand discharge pipe. Various structures are provided for regulating these flows of air.

24 Claims, 10 Drawing Figures

DEVICE FOR REGULATING DISCHARGE OF SAND FROM A VEHICLE SANDER

The present invention relates to a sanding apparatus for rail and other vehicles, more particularly, to the regulation of the discharge of sand from the sanding apparatus.

Various devices have been employed on rail and other vehicles for discharging desired quantities of said onto the road or rails immediately preceeding the vehicle wheel so as to improve the traction of the wheel upon the surface. Devices have also been provided so as to regulate or meter the quantity of sand discharged per unit time in this manner. One such sander apparatus essentially comprised a funnel-shaped container for storing sand which container is substantially air tight. Connected to an outlet of the container is a discharge or outlet pipe through which the sand is discharged. An air line is connected to the sand discharge pipe for introducing air into the discharge pipe and a structure generally provided for regulating the flow of air into the discharge pipe so as to determine how much sand is to be discharged per unit time.

Known devices for regulating or metering the quantity of sand to be discharged have been unsatisfactory in practice since when the sand in the container becomes moist or even damp the flow of the sand is influenced and proper functioning of the device is adversely affected. If the flow of dry sand is arbitrarily established to be 100%, the flow property of sand with 0.5 parts of water would be only 70%. With 1.0 (percentage by weight) parts of water in the sand the flow of the sand would be only 40%. With 1.5 (percentage by weight) parts of water in the sand the sand will not be able to flow at all. Moisture in the sand causes the particles to stick together with a force which at 1.5 parts of water is already more than the forces which bring about the flow of dry sand.

If only gravity forces are relied upon for flowing the sand, the flow of sand will stop at percentages which are even lower than 1.5.

Although it is known that subjecting moist sand to air pressure can exert considerable force upon the sand and improve somewhat the flow properties of the sand, the sticking or adhering forces brought about by moisture in the sand are not generally overcome with the air pressure used in such metering devices.

In addition, known sand-regulating devices have a relatively limited range of adjustment of the sanding rates which is approximately 0.2 kg–0.6 kg per 30 seconds. Tests have shown that the sanding device can be used at its maximum discharge rate with low air consumption only when the metering range is between a few grams per 30 seconds and several kilograms per 30 seconds.

It is therefore the principal object of the present invention to provide a novel and improved device for regulating the discharge of said from a vehicle sanding apparatus.

It is another object of the present invention to provide such a regulating device which is simple in construction, more reliable in operation and expands considerably the range or rates at which sand can be discharged with relatively great accuracy.

It is an additional object of the present invention to provide such a sand-regulating device which can be readily incorporated or adapted for use in existing vehicle sanders.

The present invention essentially comprises providing in the sand storage container an exhaust air line whose open end is in the upper portion of the container and a supply air line introduces air into the bottom portion of the container. When air is supplied at a sufficiently high pressure, a first portion of the air together with sand influenced by gravity flows directly into the sand discharge pipe. The remaining portion of the air after flowing through the sand in the container enters into the open end of the exhaust air line and is then flowed into the sand discharge pipe. Depending on the adjustment of the throttle crosssection in the exhaust air line, the quantity of sand to be conveyed per unit time can be adjusted over a relatively wide range so that maximum quantities of sand can be conveyed when the exhaust air line is closed.

With the present invention rates of discharge of the sand may be accurately adjusted between 0.02 kg per 30 seconds and 5.5 kg per 30 seconds.

The reliability of the regulating device disclosed herein can be even further improved by mixing a fine-grained water-absorbing material in the sand and/or by installing a water-absorbing filter in the air line.

According to one aspect of the present invention a device for regulating or metering the discharge of sand from a sanding apparatus for rail and other vehicles may comprise a sealed container for sand with the container having a bottom wall penetrable by air. A sand discharge pipe extends into the container through the bottom wall and has one end positioned in front of a vehicle wheel. An air supply line is connected to a source of air under pressure and has an end opening to the bottom wall of the sand container. An exhaust air line has one end extending into the container above the level of sand when the container is full and has another end connected to the sand discharge pipe. Both the air supply line and the exhaust air line are provided with means for controlling the flows of air through these lines such that at a predetermined pressure of supplied air a remaining portion of the supplied air flows through the sand discharge pipe at a rate to discharge a predetermined quantity of sand per unit time from the sand discharge pipe.

Various valves and other structures may be employed to regulate or control these flows of air in order to meter the discharge of sand.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the invention will be described in detail.

Figure 1:
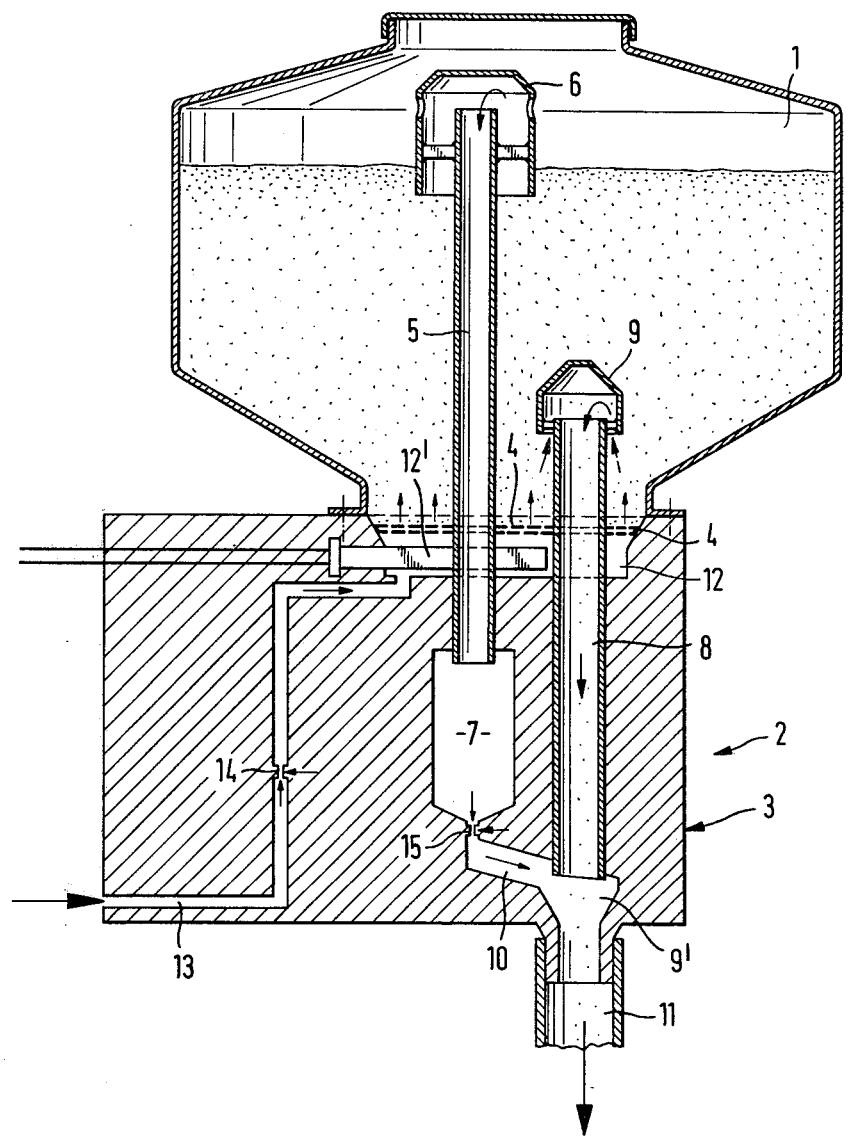
FIG. 1 is a vertical sectional view of a schematic representation of the sand container and regulating device according to the present invention.

In FIG. 1 there is illustrated a sand supply container 1 the lower end of which is open and is bolted or flanged to a sand-metering or regulating device indicated generally at 2. The regulating device 2 together with the sand container 1 provides a sand quantity regulating structure according to the present invention.

The sand container 1 may be standard container which is known in the art and one which can be easily attached to the regulating structure 2. The upper end of the sand container 1 is substantially air tight. The regulating device 2 comprises a housing 3 in which are formed a number of chambers, spaces and passages all of which will be described in detail. The open bottom of the container 1 is closed by a sintered metal plate 4 which may be perforated so as to be penetrable by air. The sintered metal plate 4 thus provides a closure for the upper portion of the housing 3 and for the lower portion of the sand container 1.

The bottom wall 4 is provided with two openings within which are positioned an air exhaust pipe 5 and a sand discharge pipe 8. The upper end of the discharge pipe 5 terminates above the level of sand when the container is filled to its maximum capacity. This upper end is positioned beneath a bell-shaped protective shield 6. The lower end of exhaust air pipe 5 extends into a chamber 7 formed within the housing 3.

The sand discharge pipe, similarly, has an upper end terminating in the lower portion of the container 1 underneath a bell-shaped protective shield 9. The lower end of the pipe 8 extends into a chamber 9 formed in the housing 3. The chamber 9 is inclined and positioned below the chamber 7 but is connected with the chamber 7 by means of a passage 10. The chamber 9 is also connected at its lower portion with a sand discharge pipe 11 whose other end terminates at a position close to and in front of a vehicle wheel above the surface upon which the wheel is positioned. The pipe 8 extending below its shield 9 in the supply container 1 together with the sand discharge pipe 11 thus forms the sand discharge pipe for the discharge of sand from the container.

Figure 1A:
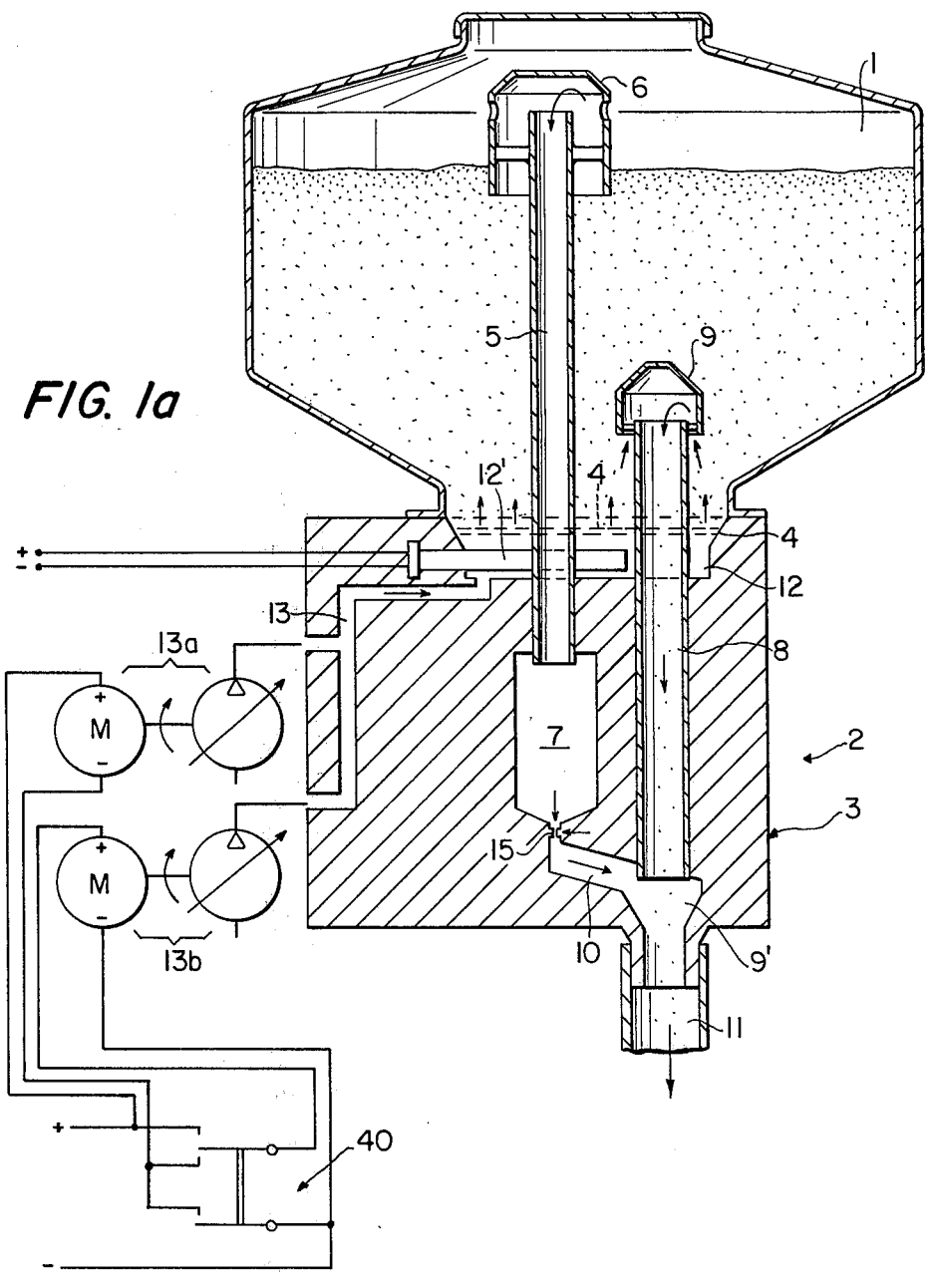
FIG. 1a is a view similar to that of FIG. 1 and showing two controllable rotatable compressors as a source of air.
Figure 1B:
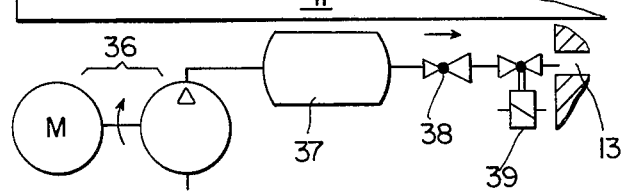
FIG. 1b is a schematic representation showing a source of air including an air reservoir supplied by a compressor for the device of the present invention.

Within the housing 3 below the sintered plate 4 there is formed a recess or chamber 12 to which is connected a passage 13 also formed within the housing 3 and in turn connected with a source of air under pressure. The source of air pressure is not illustrated but may comprise various forms of compressors and may also comprise an air reservoir mounted on a vehicle 41 shown in FIG. 1b, particularly a rail vehicle, and supplied by air through a compressor.

In the passage or line 13 there is a nozzle or throttling orifice 14. A heating cartridge or element 12' extends into the recess 12 and together with this recess 12 forms a heating chamber for air supplied to the sand container.

The exhaust air chamber 7 is connected through an exhaust air nozzle 15 to the exhaust air passage 10.

In the operation or functioning of this sanding device, supply air, which is reduced to a predetermined pressure by means of a suitable pressure-reducing valve, which is not shown, is introduced through passage 13, past the nozzle 14 and into the chamber 12 from which air flows upwardly through the plate 4 into the sand container 1. In order to conduct a sanding operation two flows of air must be established within the container 1. These flows are the metering or regulating air flow and the exhaust air flow. The metering air flow which is a portion of the supplied air flows over a more direct route under the protective shield 9 into the sand discharge pipe 8,11 and thereby conveys or carries sand through the pipe 8,11. Such a sanding operation is generally carried out under predetermined weather and load conditions.

The exhaust air flow is a portion of the supplied air and flows upwardly through the sand in the container 1 and over and around the bell shield 6 downwardly through exhaust pipe 5 to arrive in the chamber 7. This exhaust portion of the air flow then flows through the nozzle 15 and exhaust channel 10 into the chamber 9 and is reunited with the metered air flow. The exhaust air flow dries the sand and thus maintains the sand in a condition to flow readily. In this manner, sand is reliably conveyed through the sand pipe. The rates of flow of the metered air and the exhaust air can be adjusted very accurately and precisely by means of the nozzles 14 and 15 so that at a predetermined pressure of supply air a constant flow of sand through the pipe 11 is achieved.

If the pressure of the supplied air is below a predetermined level, then the air flowing into the sand pipe 8,11 will not be sufficient to convey the sand into the sand pipe. Should this occur, the supply air functions only to dry or loosen up the sand so as to maintain the sand in a condition for sanding.

If the pressure of the supplied air is above a predetermined level and if the pressure of the supplied air is varied above this predetermined level, the rate at which the sand is discharged will be varied correspondingly.

If, for example, a controllable compressor which may be a rotary vane compressor is used as an air pressure source, a continuously variable discharge of sand can be achieved depending on the adjusted capacity of the compressor as long as the pressure of the supply air in the passage 13 is above the predetermined level at which only a drying or loosening up of the sand is achieved. Instead of a controllable compressor, different pressure-reducing valves may be so selected and connected to the supply air line which, depending on the pressure-reducing valve selected, will transmit the supplied air at a predetermined pressure level to the air supply line 13 so that sand may be discharged at varying rates but in different stages.

The nozzle or orifice 14 in the air supply line 13 functions to adapt to the discharge pressures of the source of air under pressure which exist at any time. An accurate exhaust throttling may be adjusted by means of the exhaust nozzle 15. Increased throttling of the exhaust air results in a increase of the metered air flow and consequently more sand is discharged through the sand pipe 8,11.

Should the sand in the storage container 1 contain excessive moisture so as to be damp and have poor flow properties, the heating element 12' can be connected to a source of electrical energy and the heating element will thus heat the chamber 12 below the sintered plate 4 and heat the sintered plate 4 itself. As result, the air supplied into the container is heated and will thus expedite the process of drying sand in the container.

The air supply flow can be divided into different proportions so that when air is supplied at approximately 30 liters/min approximately 50% of this air flows through the container and is discharged as exhaust air through the exhaust pipe 5 while the remaining 50% of the supplied air flows over the sand shield 9 directly into the sand pipe 8,11 so that no sanding will occur. This means that with a relatively high air content the sand in the container 1 can be dried without a sanding operation.

Figure 2:
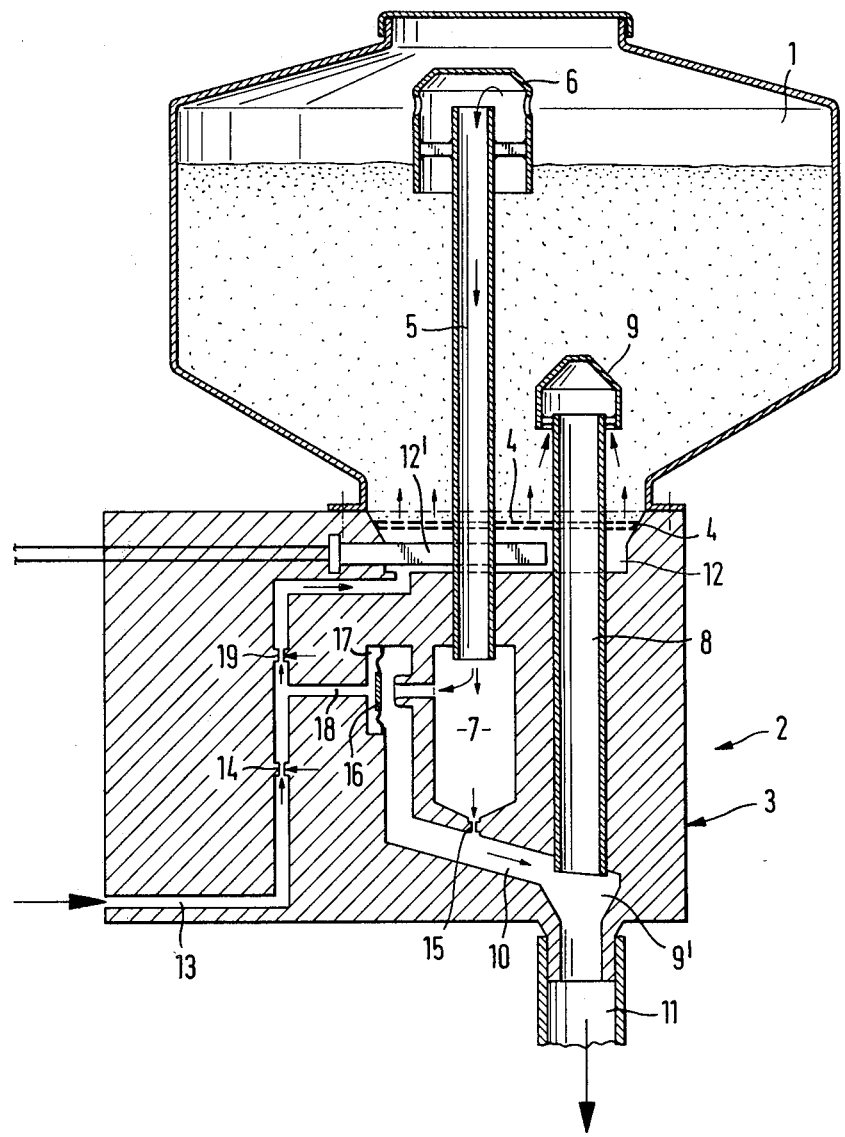
FIG. 2 is a view similar to that of FIG. 1 but showing a modification utilizing a diaphragm valve to regulate exhaust air flow.

In the modification of FIG. 2, there is provided a diaphragm valve 16 which is parallel to the exhaust air nozzle 15. When the diaphragm valve 16, which has a preselected cross-sectional area, is open, the exhaust air pipe 5 is connected through the exhaust air nozzle 15 and through the open valve seats of the diaphragm valve 16 to the exhaust air channel 10. The diaphragm valve 16 has a control chamber 17 which is closed off by the diaphragm and is connected by a control line 18 which branches off from the supply air line 13. The nozzle 14 is upstream of the connection of the control line 18 to the air supply line 13. There is a second nozzle or throttling orifice 19 in the air supply line 13 downstream of the connection of the control line 18.

If the air supply line 13 is connected to a source of air pressure which is at a pressure of approximately 2 bar, pressurized air may then be introduced into the sand container 1 for drying of the sand without any sand being discharged through the sand discharge pipe. The various parameters may be so selected that only when a pressure level of 2 bar is exceeded will the diaphragm valve 16 be closed so that only a substantially lower exhaust air flow will flow through the exhaust air pipe 5 and through the exhaust air nozzle 15 to the sand pipe. However, a correspondingly higher metered air flow will flow over the sand bell 9 directly into the sand pipe 8 sufficient to discharge sand. In an actual test conducted at a pressure of 2.2 bar, sand was discharged at a rate of 330 grams/min.

The nozzle 14 can be eliminated if the pressures at the entrance of the air supply line 13 are adjusted sufficiently low. In order to employ a particular diaphragm valve 16 at different sources of air pressure, it is preferable to employ the nozzle 14 so that the entry pressures can be readily adjusted. The additional nozzle 19 in the air supply line 13 builds a pressure head in the control chamber 17 which, at a predetermined capacity, leads to actuation of the diaphragm valve 16. If, for example, the pressure of the supplied air is increased from 2.2 bar to approximately 3 bar, sand would be discharged at a rate of approximately 800 gr./min; and at a supplied air pressure of approximately 4 bar, sand would be discharged at a rate of approximately 1300 gr./min.

If the pressure in the air supply line 13 is 1.5 bar as result of the use of pressure-reducing valves, then there will occur only a drying of the sand in the container and no sanding. Only at a pressure of approximately 2.2 bar (in the present example) wil the diaphragm valve 16 be closed and at that time approximately 330 gr./min. of sand will be discharged. If a compressor 13', preferably a rotary compressor is connected to the air supply line 13 the quantity of supplied air may be selected depending on the speed of rotation of the compressor. Using two compressors 13a and 13b whose discharge outlets are parallel to the entrance of the air supply line, a simple control can be achieved by employing a standard electrical mechanism indicated at 40 in FIG. 1a which switches the compressors into an electrically parallel or series connection. As may be seen in FIG. 1b, an air reservoir 37 is supplied by a compressor 36. Between the entrance of air supply line 13 and reservoir 37 is a pressure-reducing valve 38 and a magnetic valve actuator 39 for the valve 38.

If pressure-reducing valves are provided in the air supply line so as to permit air supply pressures of 1.5, 2.2, 3, and 4 bar, drying only of the sand will be achieved by utilizing supplied air at 1.5 bar. Sanding will be achieved at a first metering stage of 2.2 bar and second and third metering stages at 3 and 4 bar. The addition of one or more pressure-reducing valves to the air supply line can be followed respectively by a magnetic valve. The pressure-reducing valves and the magnetic valves can be located in the control room of the vehicle.

Figure 3:
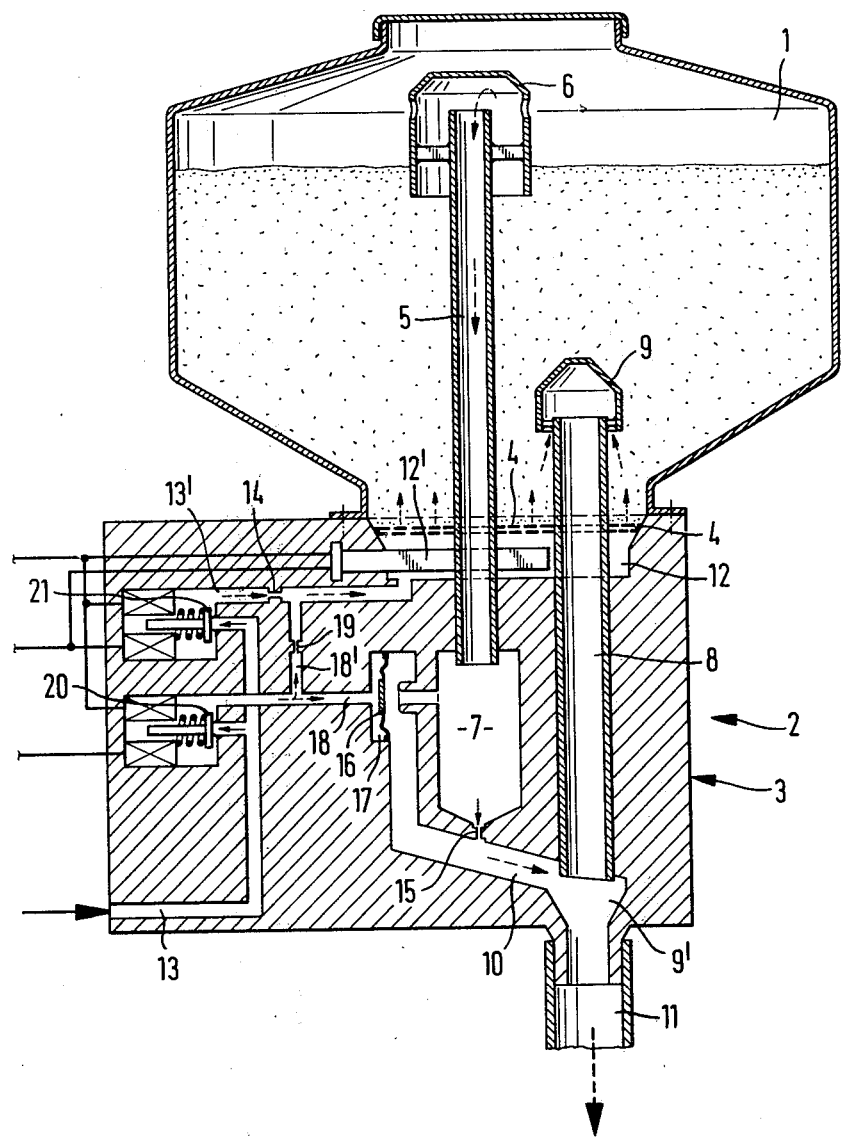
FIG. 3 is a view similar to that of FIG. 2 and showing a further modification of the device of FIG. 2 utilizing two magnetic valves.

The modification of FIG. 3 differs from the structure of FIG. 2 in that two magnetic valves are provided in the housing 3. The diaphragm valve 16 can be connected to the air supply line 13 by means of a first magnetic valve 20. When the magnetic valve 20 is closed, the air supply line 13 can be connected over the other magnetic valve 21 only to the heating chamber 12, 12'. When the magnetic valve 21 is open, the air supply line 13 is then connected by a connector passage 13' to the heating chamber 12,12'. The nozzle 14 is located in the connector passage 13'. In addition, control line 18 leading to the diaphragm valve 16 is connected to the heating chamber 12,12' over an additional control line 18' and in the control line 18' there is located a nozzle 19.

Under normal operating conditions, the pressure of the supplied air is substantially constant in the air supply line 13 and on the magnetic valves 20 and 21 when they are closed. If sand is to be dried in the container 1 without a sanding operation, the magnetic valve 21 is actuated in parallel thereto the heating element 12' will be energized. The magnetic valve 20 remains closed during the operation of drying the sand. The air travels through channel 13' and the nozzle 14 into the heating chamber 12,12' and is heated therein. The diaphragm valve 16 remains open since the closing pressure for the diaphragm, subject to the adjustment of the nozzles 14 and 19, cannot be attained. By means of the open diaphragm valve 16 and the exhaust air nozzle 15 there is formed a relatively high substantially unthrottled flow of exhaust air in the storage container 1 which dries the sand while the remaining portion of the air flow which exits from the container through the pipe 8 is not sufficient for a sanding operation.

If it is desired to initiate a sanding operation, the magnetic valve 20 is then actuated. The air now travels also through the passages 18 and 18' and the nozzle 19 into the storage container 1. The pressure head in front of the nozzle 19 causes the diaphragm valve to be pushed into its closed position so that a relatively small flow of exhaust air, which exhaust air flow is achieved only by means of the exhaust air nozzle 15, causes a substantial increase in air flow through the sand pipe 8 such that a predetermined rate of sand is conveyed through the pipe 8,11. In the regulating device of FIG. 1 a drying and subsequent sanding can be achieved by means of two magnetic valves when the supply air line 13 is connected to a substantially constant supply air pressure. Thus, sanding is interrupted for that length of time that the diaphragm valve is not actuated.

Figure 4:
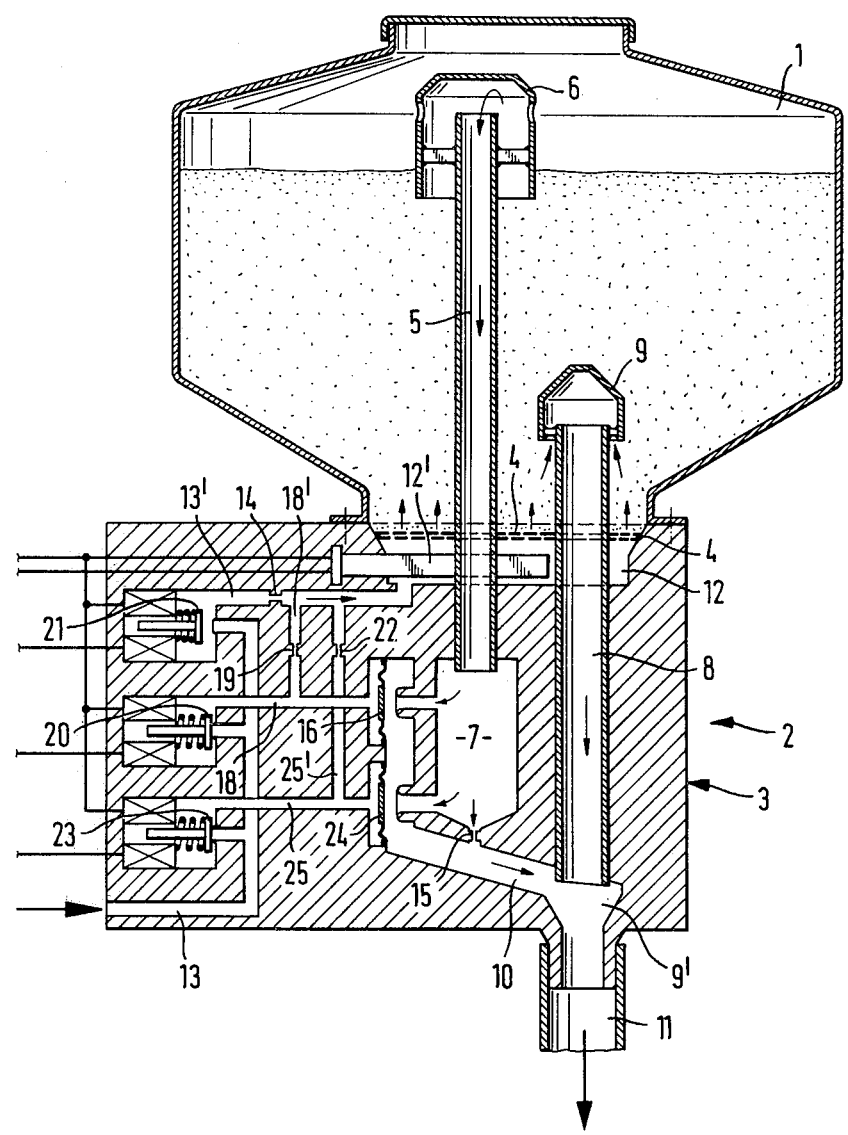
FIG. 4 is a view similar to that of FIGS. 1–3 but showing a modification using two parallel diaphragm valves for the exhaust air line and three magnetic valves.

The modification of FIG. 4 differs from the structure of FIG. 3 in that in addition to the diaphragm valve 16 in FIG. 3, there is provided an additional diaphragm valve 24 and, in addition to the magnetic valves 20 and 21 in FIG. 3, there is provided a further magnetic valve 23. The diaphragm valve 16 is similarly connected to the air supply line 13 through the control line 18 and the magnetic valve 20 as was described above in FIG. 3 and is connected to the heating chamber 12 by means of the control line 18' having nozzle 19 therein. Further, as described for the modification of FIG. 3, when the magnetic valve 20 is closed and the magnetic valve 21 is open, the heating chamber 12 is connected to the air supply 13 by means of the passage 13' and the nozzle 14. The other diaphragm valve 24 is connected to the air supply line 13 by means of a passage 25 and the third magnetic valve 23, and is connected to the heating chamber 12 by means of a passage 25' having a nozzle 22 therein.

The regulating device of FIG. 4 functions in a manner corresponding essentially to the functioning of the device of FIG. 3. By means of the additional magnetic valve 23, the diaphragm valve 24 and the nozzle 22 in passage 25', the exhaust air flow and consequently the metering air flow can be so controlled that three sand metering stages can be achieved by selective actuation of the magnetic valves 20, 21, and 23. The inclusion of the magnetic valve 21 in the metering control achieves six metering stages so that the quantity of sand to be discharged may be adapted to virtually all possible operating requirements and conditions.

Figure 5:
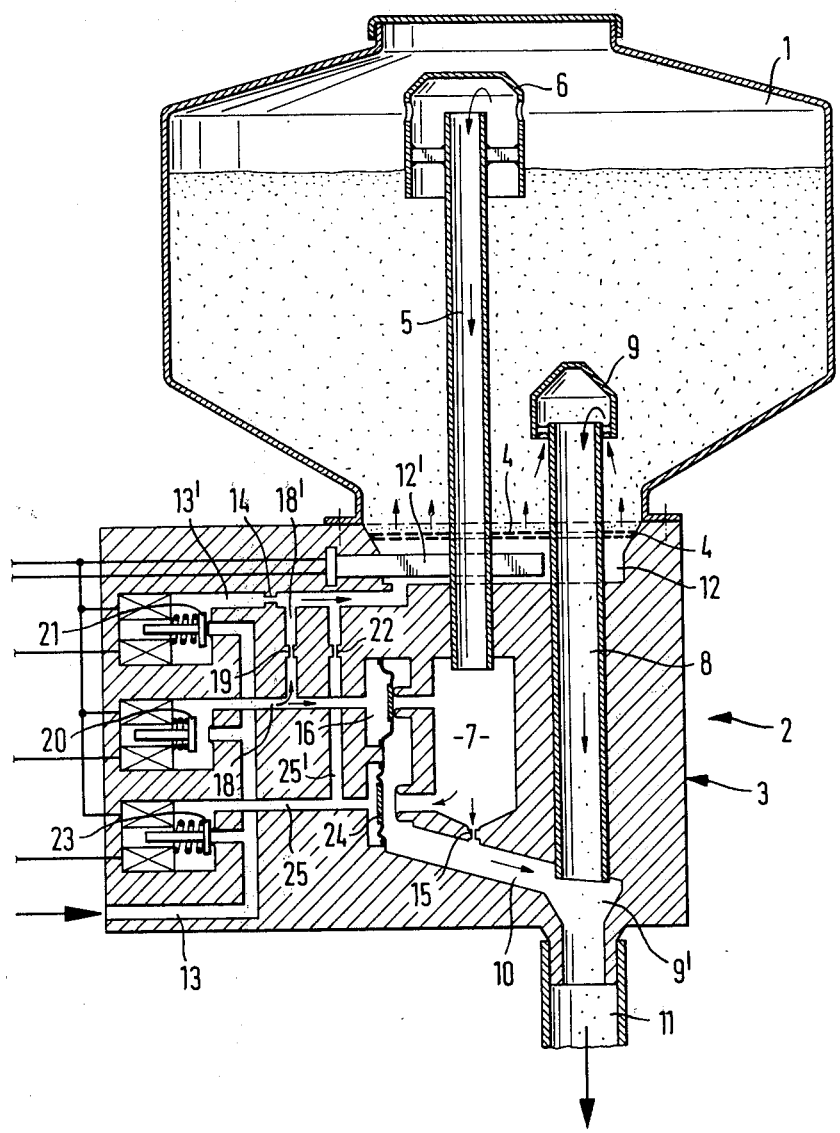
FIGS. 5–7 are views similar that of FIG. 4 and showing different positions of the valves of the FIG. 4 structure.

For a three-stage metering control, the nozzles 14, 19 and 22 and the cross-sectional openings of the diaphragm valves 16 and 24 may be so selected that when air is introduced at the air supply line 13 both diaphragm valves are open when the magnetic valves 20 and 23 are closed and the magnetic valve 21 is open, as shown in FIG. 4. By means of the open magnetic valve 21 and the nozzle 14 there will only be a flow of drying air which is heated in the chamber 12 and delivered to the container 1. Approximately 50% of the drying air into the container flows as exhaust air through the exhaust air pipe and open diaphragm valves 16 and 24 as well as the exhaust air nozzle 15 into the lower portion of the sand pipe. This exhaust air produces a drying and loosening of the sand in the container 1. The remaining portion of dry air flows through the sand pipe 8,11 but without conveying any sand. A first metering stage of discharged sand may be discharge of sand at 300 gr./30 sec. during which the magnetic valves 21 and 23 are closed and only the magnetic valve 20 is open as shown in FIG. 5. The nozzles 19 and 22 are so selected that in this particular embodiment upon closing of the diaphragm valve 16, the diaphragm valve 24 remains open. Thus, exhaust air can flow into the sand pipe 8,11 only through the open diaphragm valve 24 and the exhaust nozzle 15. The flow of exhaust air through the exhaust air pipe 5 is thereby decreased and will be correspondingly increased depending on the metering air flowing through the sand pipe 8,11 so as to maintain a constant flow of sand of 300 gr./30 sec. discharged from the sand pipe 8.

Figure 6:
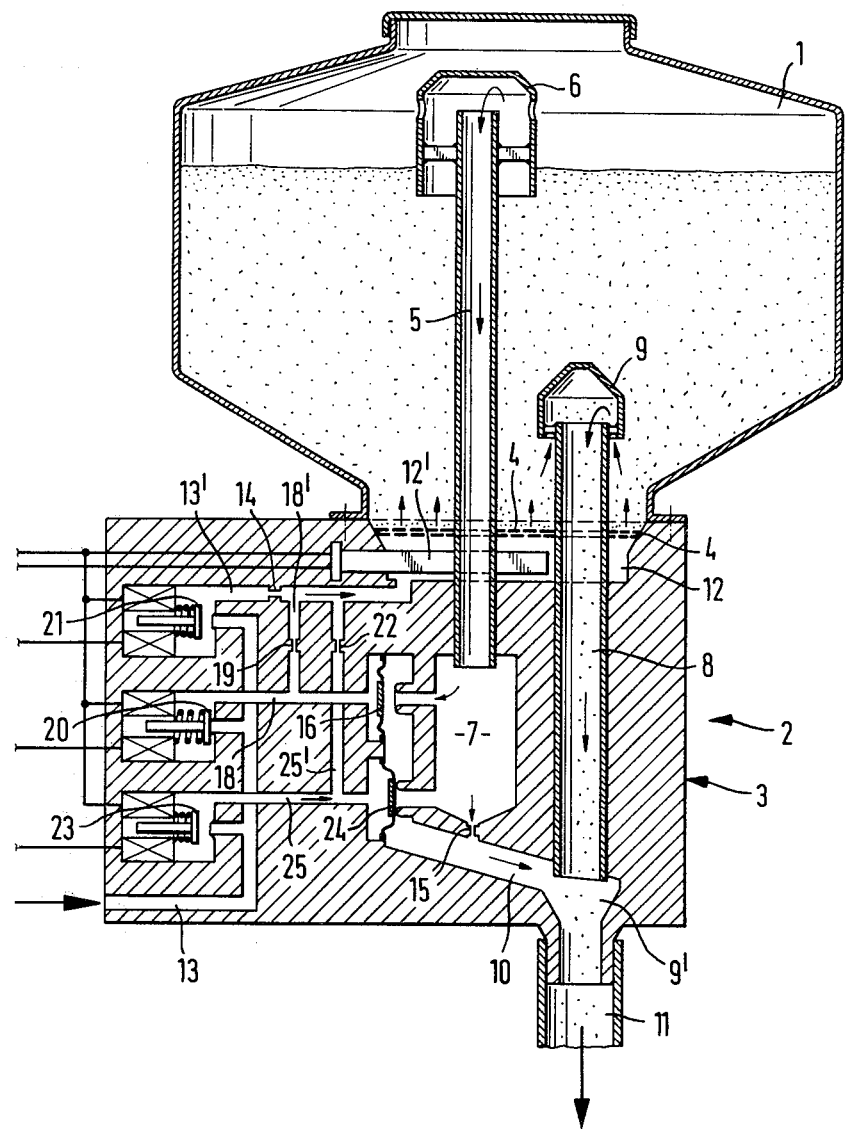

In order to establish a second metering stage at which an increased quantity of sand is discharged, such as for example 1500 gr./30 sec., the magnetic valves 21 and 23 must be open and the magnetic valve 20 must be closed as shown in FIG. 6. In this particular example, the diaphragm valve 24 is closed and the diaphragm valve 16 is open. Because of the smaller cross-sectional opening of the diaphragm valve 16 is compared to the diaphragm valve 24, the flow of exhaust air is further throttled and the metering air flow is correspondingly further increased so as to obtain a higher continuous discharge of sand at the rate of 1500 gr./30 sec.

Figure 7:
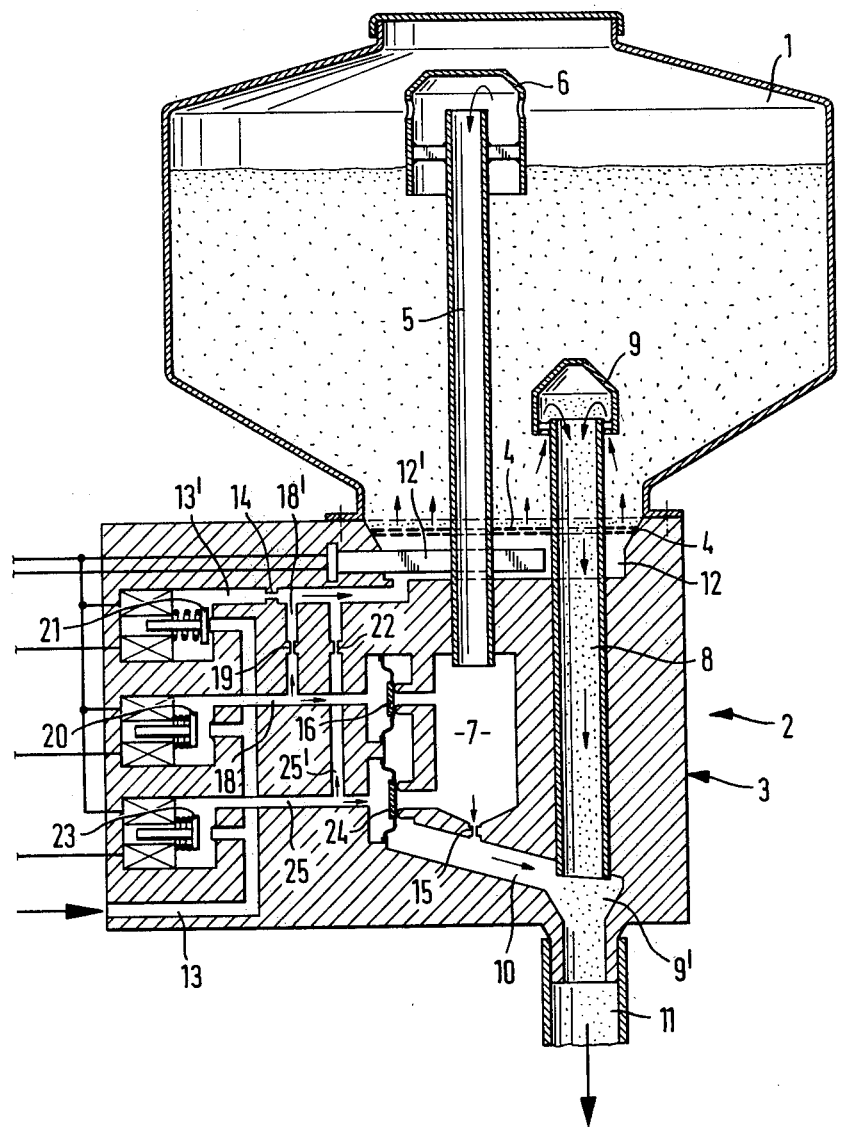

In a third metering stage the magnetic valve 21 is closed and both magnetic valves 20 and 23 are open and both diaphragm valves 16 and 24 are closed as may be seen in FIG. 7. As a result, the flow of exhaust air through the exhaust air nozzle 15 into the sand pipe 8,11 is throttled even further whereupon the flow of supplied air flowing into the sand pipe 8,11 is further increased which provides for the discharge at a continuous rate, for example, 2700 gr./30 sec.

It is apparent that the above-described regulating devices can be expanded to six metering stages if, in addition to the above described magnetic valve controls or switches, three additional magnetic valve controls are incorporated. With the additional controls there could then be obtained three additional metering stages by opening all three magnetic valves 20, 21 and 23, opening only of valve 23, and opening of magnetic valve 20 and 21 and closing valve 23.

Figure 8:
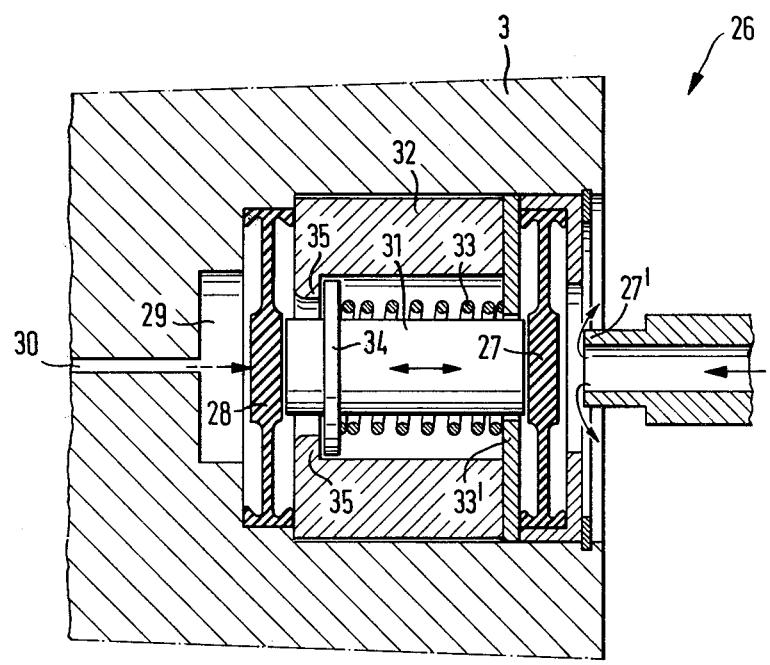
FIG. 8 is a vertical sectional view in an enlarged scale of a diaphragm valve employed in the present invention.

In FIG. 8 there is illustrated a diaphragm valve 26 which can be advantageously employed in the regulating device disclosed herein. The valve 26 includes two spaced diaphragms 27 and 28. Diaphragm 27 is opposed from and engageable with a valve seat 27' and the second diaphragm 28 closes off a control chamber 29. The control chamber 29 is connected through a control line or passage 30 to the air supply channel 13 (FIGS. 2-7). Between the diaphragms 27 and 28 there is an axially displaceable pushrod or plunger 31 within a valve housing 32 and the pushrod 31 is loaded by a spring 33 in the direction of the second diaphragm 28. One end of the spring 33 is supported on a housing ring 33' and the other end is supported by an external flange 34 near one end of the pushrod 31. The one end of the pushrod 31 extends through a central opening of the housing ring 33' so as to be closely positioned to and engageable with the diaphragm 27. The other end of the pushrod 31 extends through a similar central opening in the valve housing 32 and is positioned adjacent to and engageable with the second diaphragm 28. The spring-loaded pushrod 31 is supported by its flange 34 engaged upon a housing shoulder 35 when the second diaphragm 28 is not loaded.

The advantage of the double-diaphragm valve 26 of FIG. 8 is that a pressure in the control chamber 29 against a particular spring force moves the valve 26 into its closing position. However, the spring 33 of the valve is located in a space which is free of sand. In the vicinity of the valve seat 27' sand particles may appear which may reach the exhaust air chamber 7 through the exhaust air pipe 5.

The double-diaphragm valve of FIG. 8 can be readily modified into a throttle valve which opens to a predetermined extent depending upon the amount of pressure. This valve can be modified in many other ways to achieve similar results as known to those skilled in the art and which need not be described in detail. By way of example, a needle or the like on the diaphragm 27 may extend deeper into a modified valve seat to open or expose a smaller opening. The smaller the opening the higher can be the pressure in the control chamber 29. In this manner, upon increasing pressure in the air supply channel 13 the exhaust air can be throttled to a greater degree which means that the metering air and thus the quantity of sand to be transmitted per unit time increases continuously.

The exhaust air regulating device consisting of the nozzle 15 and at least one parallel exhaust air valve may be so modified that should any sand accidentally enter this device will not be blocked. If, for example, sand has entered into the exhaust pipe 5 underneath the bell shaped shield 6, the sand will descend through the nozzle 15 onto a sloping surface of the chamber 10 so that the sand will then slide into the sanding pipe 11. This will prevent any accumulation of sand which accumulation could easily affect the proper functioning of the quantity-regulating device. In this preferred arrangement of the valve 16 there is thus no possibility that any sand can accidentally settle in the vicinity of the valve 16 so as to adversely affect the proper functioning of the regulating device.

It is therefore apparent that the present invention has disclosed a sand regulating or metering device wherein the flow of air through the air supply line and the exhaust air line can be so controlled that above a predetermined level of pressure of supplied air sand will be discharged, but below this predetermined level of supply air pressure sand will not be discharged and only drying of the sand will occur. With this predetermined ratio or proportioning of the air flows between the supply air and the exhaust air only the supply air pressure need by varied to achieve either a drying only operation or a drying and sanding operation.

It will be understood that this invention is susceptible to modification in order to adapt it to different usages and conditions and, accordingly, it is desired to comprehen such modifications within this invention as may fall within the scope of the appended claims.

What is claimed is:

1. In a device for regulating the discharge of sand from a vehicle sanding apparatus particularly on rail vehicles, a sealed container for sand and having a bottom wall which is penetrable by air, a sand discharge pipe extending into said container through said bottom wall and having one end positionable in front of a vehicle wheel, an air supply line connected to a source of air under pressure and having an end opening to said bottom wall, an exhaust air line having one end extending into said container above the sand when the container is full and having another end connected to said sand discharge pipe, and means in said air supply line and said exhaust air line for controlling the flow of air therethrough such that at a predetermined pressure of supplied air a portion of the supplied air flows through said sand discharge pipe at a rate to discharge a predetermined quantity of sand per unit time from said sand discharge pipe.

2. In a device as claimed in claim 1 wherein said air flow controlling means comprises means for throttling the flow of air.

3. In a device as claimed in claim 1 wherein said air flowing controlling means in said air supply line comprises a nozzle, said air flow controlling means in said exhaust air line comprising a second nozzle in said end connected to said sand discharge pipe, the cross-sections of said nozzles being selectively predetermined to establish predetermined flows of the supplied air and the exhausted air.

4. In a device as claimed in claim 1 wherein said exhaust air flow controlling means comprises a first lockingly adjustable nozzle and at least one second adjustable nozzle in parallel to said first nozzle.

5. In a device as claimed in claim 4 wherein said second adjustable nozzle comprises a valve having a selectable valve cross-section.

6. In a device as claimed in claim 5 wherein said second adjustable nozzle is pressure-controlled.

7. In a device as claimed in claim 5 wherein said valve comprises a first diaphragm valve controlled by the supplied air.

8. In a device as claimed in claim 7 and further comprising a first control line branching off from said air supply line to a control chamber of said first diaphragm valve and a lockingly adjustable nozzle in said air supply line downstream of said control line.

9. In a device as claimed in claim 8 and further comprising a magnetic valve in said control line, and a nozzle in said control line downstream of said magnetic valve.

10. In a device as claimed in claim 8 and comprising a first magnetic valve at the connection of said control line to the control chamber of said diaphragm valve, a second magnetic valve in said air supply line downstream of said control line, and second and third nozzles in said air supply line downstream respectively of each of said first and second magnetic valves.

11. In a device as claimed in claim 8 wherein there is a second diaphragm valve and said first and second diaphragm valves by-passing said first lockingly adjustable nozzle, a second control line branching off from said air supply line to a control chamber of said second diaphragm valve, said first and second control lines being parallel to each other, a third magnetic valve in said air supply line downstream of said first and second control lines, and a fourth nozzle in said air supply line downstream of said third magnetic valve.

12. In a device as claimed in claim 11 wherein said diaphragm valves have different valve seat cross-sections.

13. In a device as claimed in claim 12 wherein at least one of said diaphragm valves comprises a throttle valve to substantially close the free valve cross-section responsive to the pressure in the control chamber.

14. In a device as claimed in claim 7 wherein said diaphragm valve comprises two spaced diaphragms, one of said two diaphragms being opposed from a valve seat and the other diaphragm closing off a control chamber, and a displaceable plunger between said two diaphragms and a spring loading said plunger in the direction of said other diaphragm.

15. In a device as claimed in claim 5 and further comprising at least one additional second adjustable nozzle and said adjustable nozzles being parallel to each other and by-passing said first lockingly adjustable nozzle.

16. In a device as claimed in claim 15 wherein said second adjustable nozzles each have different valve cross-sectional areas.

17. In a device as claimed in claim 1 wherein said source of air under pressure comprises at least one controllable compressor.

18. In a device as claimed in claim 17 wherein said compressor comprises a rotary compressor.

19. In a device as claimed in claim 17 wherein the discharge outlets of two compressors are parallel to said air supply line.

20. In a device as claimed in claim 19 and comprising electrical switching means for selectively connecting electric motors of said compressors in one of parallel and series to a source of electrical power.

21. In a device as claimed in claim 1 wherein said source of air under pressure comprises an air reservoir supplied by a compressor on a side of a vehicle, at least one pressure-reducing valve between said air reservoir and the entrance of said air supply line, and a magnetic valve downstream of each said pressure reducing valves.

22. In a device as claimed in claim 21 wherein there is a plurality of said pressure-reducing valves connected in parallel, the discharge pressures of said pressure-reducing valves being selectively adjustable, each pressure-reducing valve having a different discharge pressure.

23. In a device as claimed in claim 1 and comprising means defining a chamber below the bottom wall of said sand container, said exhaust air line passing through said bottom wall and said another end connected to said chamber, a throttle valve at said connection of said exhaust air line and said chamber, and means defining a by-pass connection between said exhaust air line and said chamber.

24. In a device as claimed in claim 23 wherein the connection of said chamber to said by-pass is at the lowest portion of said chamber, said another end of said exhaust air line being substantially vertically disposed above said by-pass connection, said throttle valve connection being substantially horizontal to said chamber above said by-pass connection.

* * * * *